No. 641,921. Patented Jan. 23, 1900.
J. B. BARTON.
CLOTH PILER.
(Application filed Mar. 2, 1899.)
(No Model.) 5 Sheets—Sheet 1.
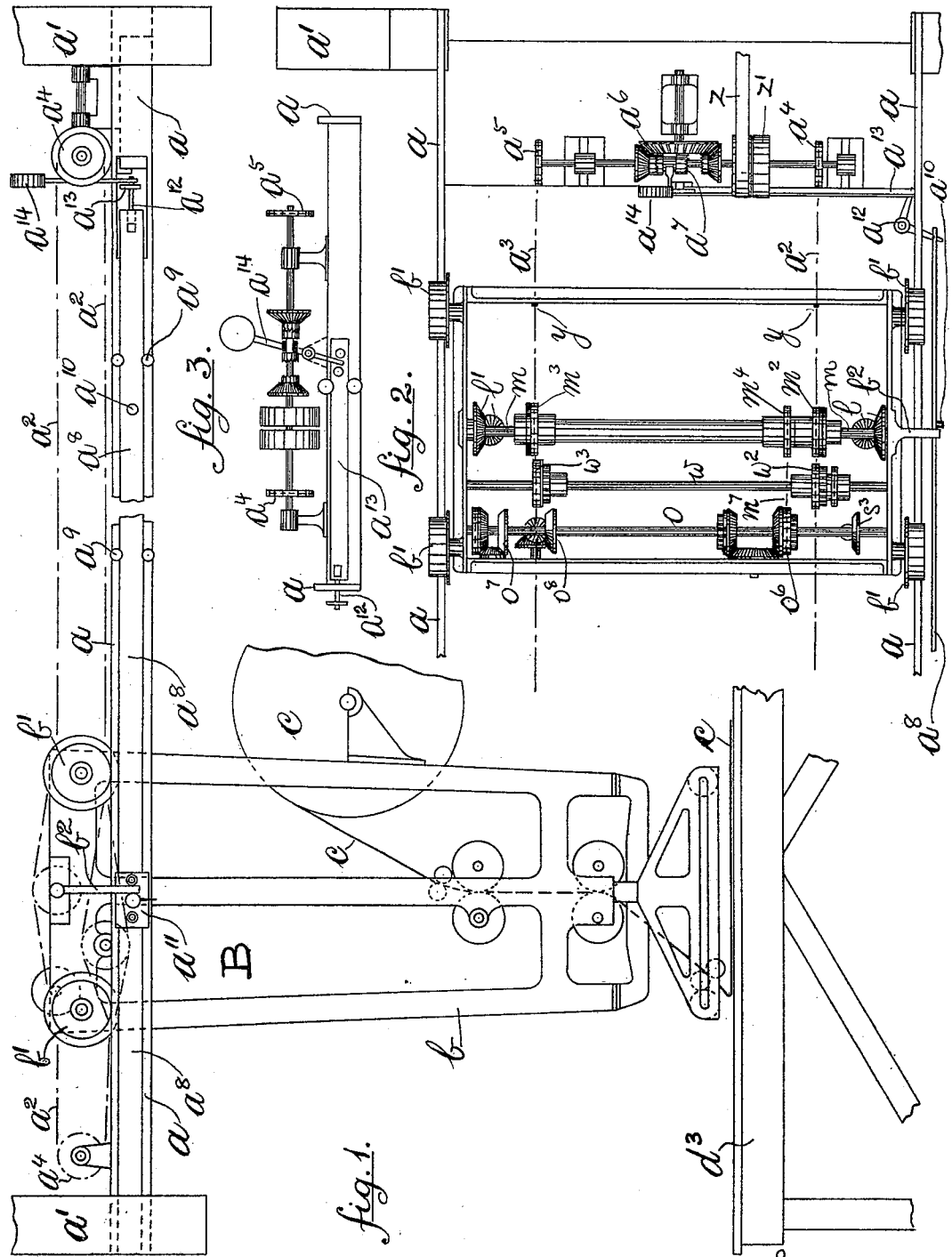
Witnesses:
George Frederick Gadd.
Arthur Gadd.
Inventor.
James Bernard Barton
per
William Gadd.
Attorney.

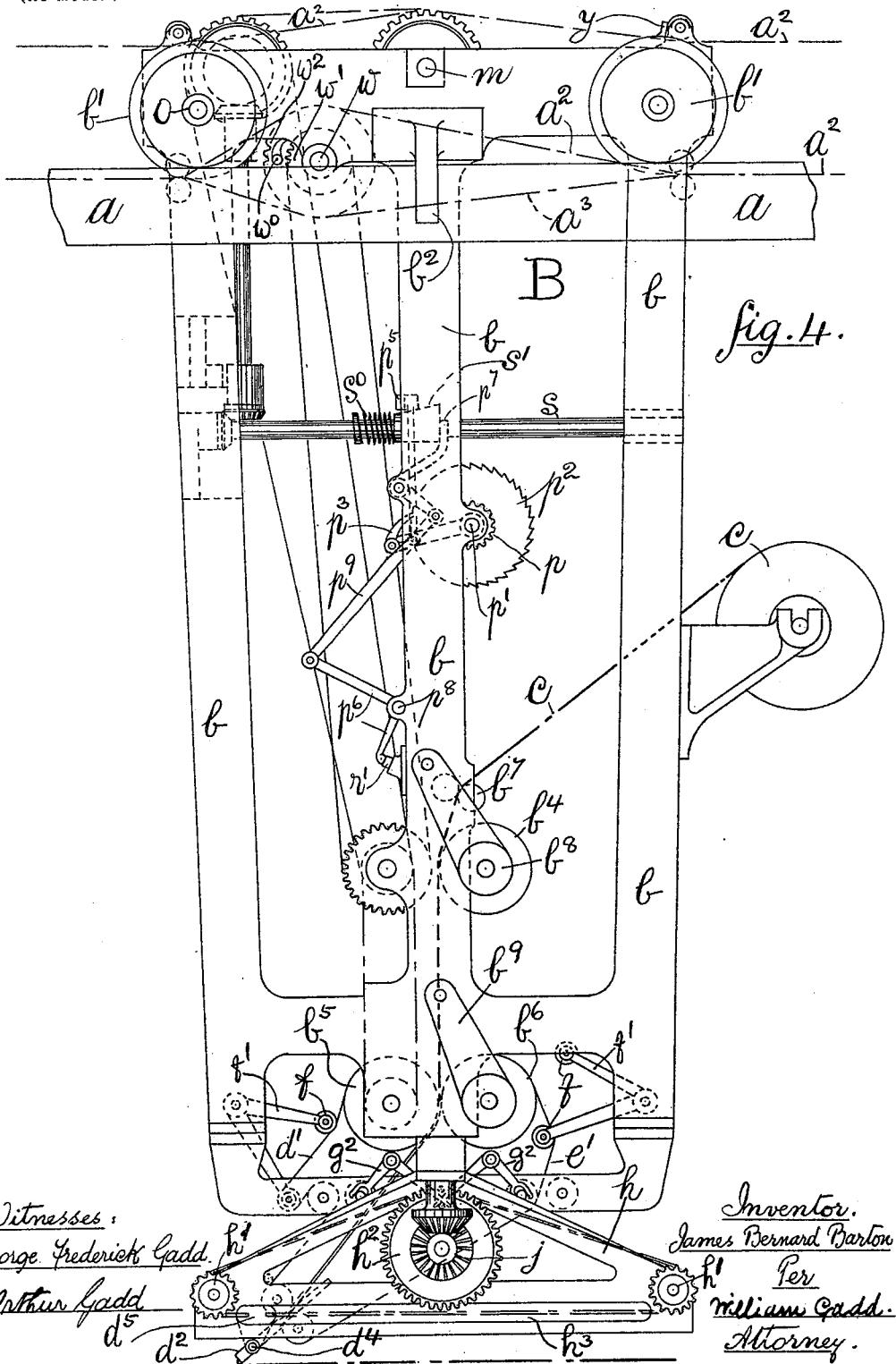

No. 641,921. Patented Jan. 23, 1900.
J. B. BARTON.
CLOTH PILER.
(Application filed Mar. 2, 1899.)
(No Model.) 5 Sheets—Sheet 3.
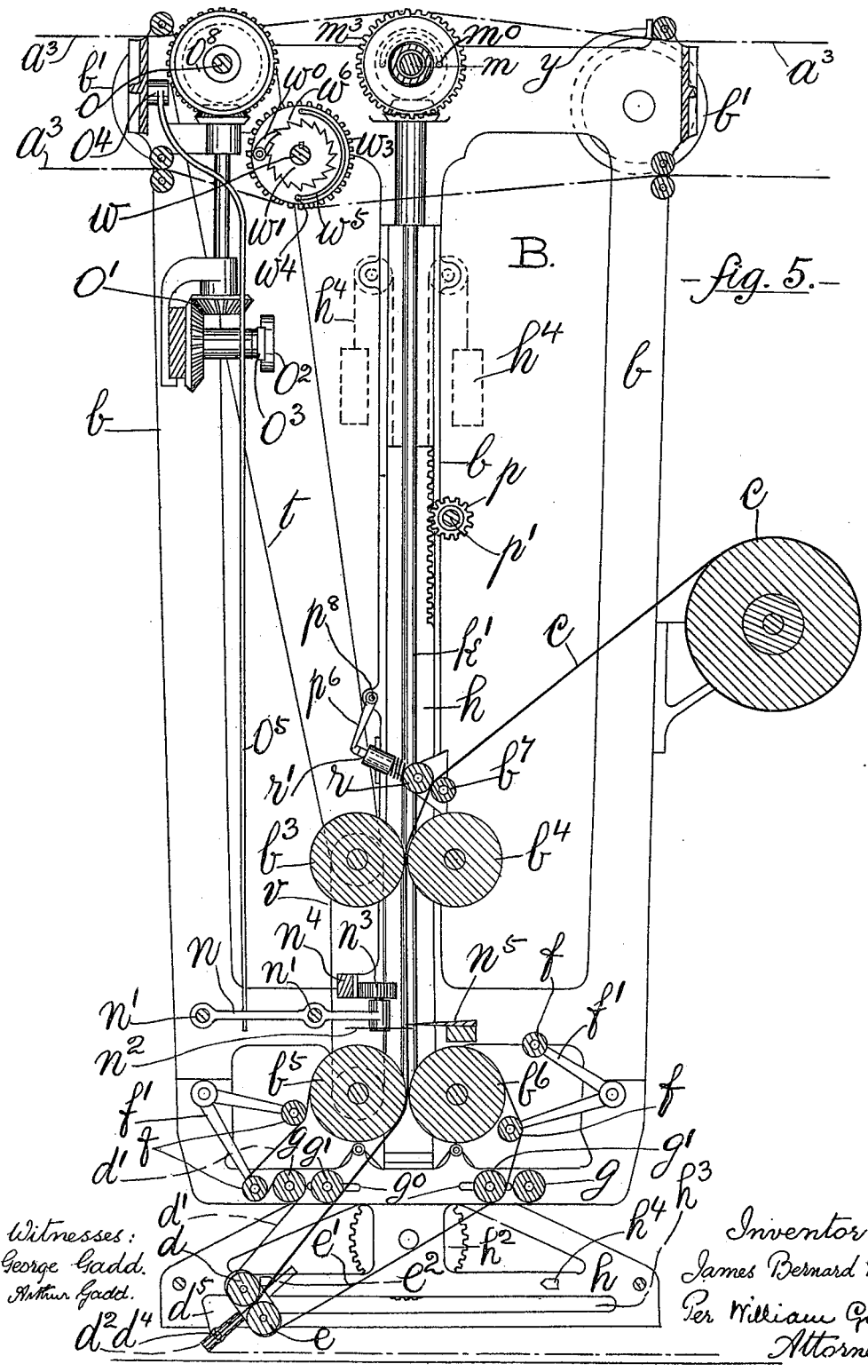
-fig. 5.-
Witnesses:
George Gadd.
Arthur Gadd.
Inventor
James Bernard Barton
Per William Gadd
Attorney.

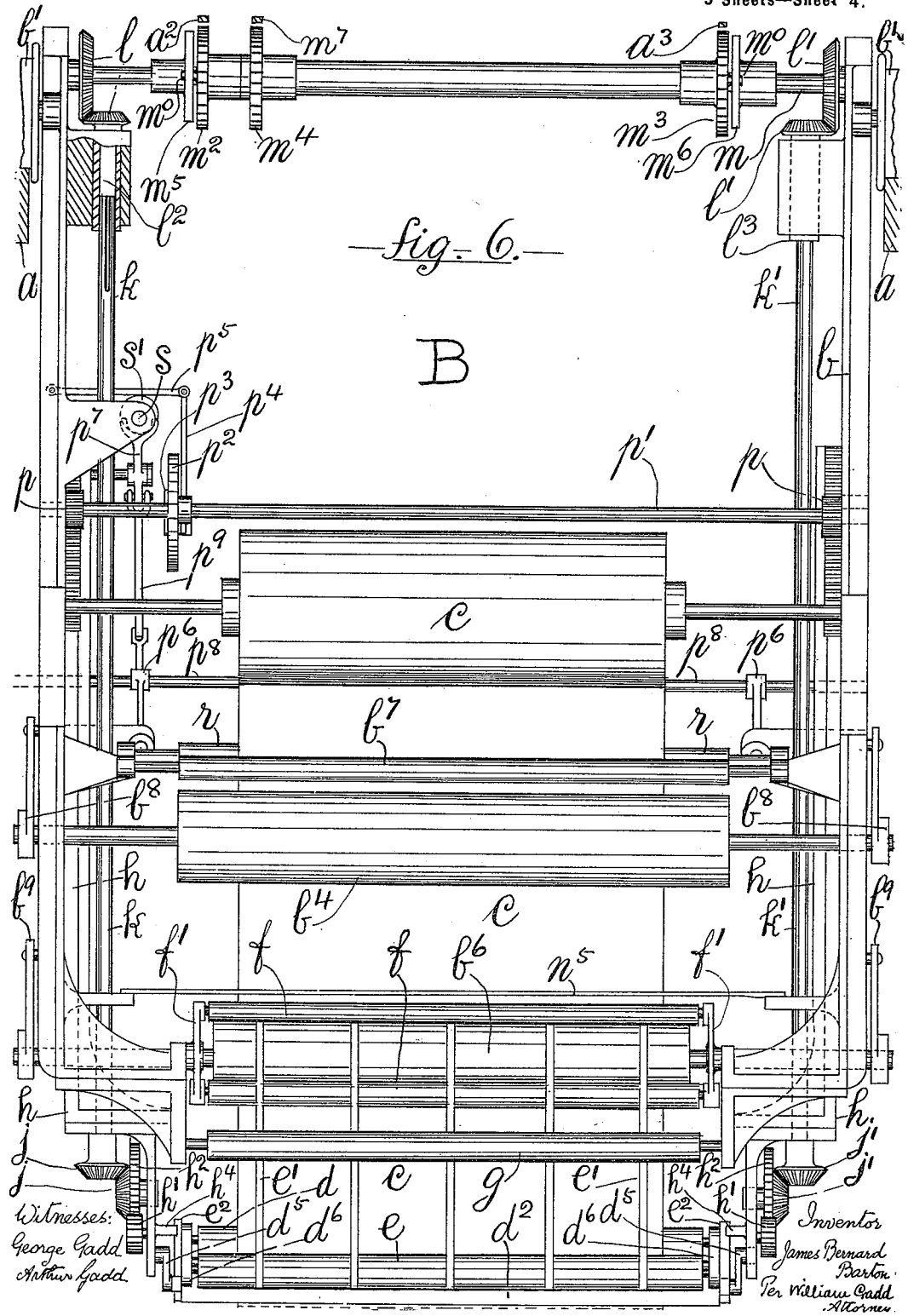

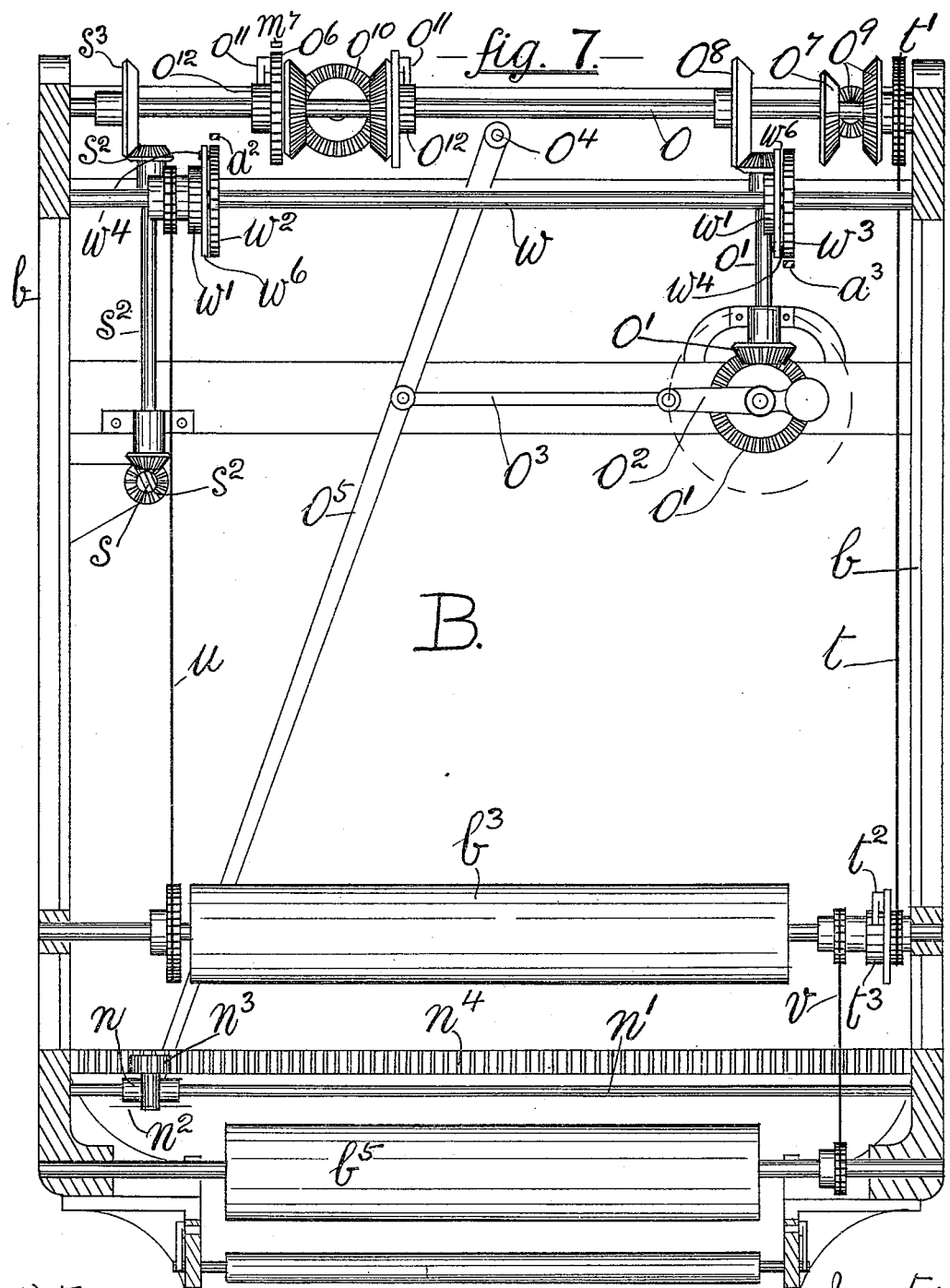

UNITED STATES PATENT OFFICE.

JAMES BERNARD BARTON, OF MANCHESTER, ENGLAND.

CLOTH-PILER.

SPECIFICATION forming part of Letters Patent No. 641,921, dated January 23, 1900.

Application filed March 2, 1899. Serial No. 707,596. (No model.)

*To all whom it may concern:*

Be it known that I, JAMES BERNARD BARTON, clothier, a subject of the Queen of Great Britain, residing at Broughton, Manchester, in the county of Lancaster, England, have invented a new and useful Improvement in Apparatus for Laying Cloth in Layers and Cutting it into Lengths, (for which I have applied for a patent with provisional specification in Great Britain, No. 17,003, bearing date August 6, 1898,) of which the following is a specification.

This invention relates to a machine or apparatus for laying a number of layers of cloth evenly one upon another in the manner required for cutting by hand or band knife in the cutting out of garments.

Upon a suitable frame or carrier is mounted a traversing carriage which is capable of being moved backward and forward any desired distance, in accordance with the length of material required for each layer of the material. Upon the frame is pivoted a reversing-lever or other device for reversing the travel of the carriage. The frame may be suspended from the ceiling or suitable supporting device above, or it may be supported on pillars, legs, or the like from below. The frame is marked with a scale of yards or other measure to indicate the length of lay. The carriage is provided with runners or wheels, which rest upon the frame, and is traversed to and fro thereon by chain, band, or straps passing over pulleys or other device. The driving-pulley is connected with a reversing motion with geared or friction wheels or the like, which are thrown into and out of gear at the end of each traverse by the reversing-lever pivoted on the frame. The carriage carries appliances for receiving and feeding forward the cloth, for laying it in position layer upon layer, and for cutting it into the required lengths, and it is also constructed so that the laying or spreading portion recedes from the pile of cloth after each layer is laid thereon. Two rollers are journaled to rotate in the carriage, over each of which is passed an endless band or set of bands, the two bands or sets of bands being placed so that for a considerable portion of their length they run parallel and adjacent to grip the cloth between them. These bands pass over two lower rollers placed side by side in an auxiliary frame or guide and are capable of being traversed from side to side therein to bring the nip of these rollers, from which the cloth is delivered, first to one side and then to the other of the carriage. These rollers are moved or traversed by a chain or chains or band or bands attached to their bearings passing over a wheel or wheels rotated first in one direction and then in the reverse by bevel-wheels from a vertical shaft or shafts or spindles driven by suitable gearing connected to the actuating part of the machine. The endless bands which grip and feed forward the cloth are kept tight upon the rollers as the lower rollers travel from side to side by counterweighted or other rollers. One or both of the main rollers are journaled in loose or pivoted arms or brackets to allow for different thicknesses of cloth. The cloth is carried forward and laid in layers by the endless bands, and when the carriage has moved its full distance and the cloth is cut the length between the delivery-rollers and the knife is laid by the independent traversing movement given to the bottom delivery-rollers.

The knife for cutting the cloth into the desired lengths is preferably circular and is carried in a saddle capable of sliding to and fro, which is brought into operation to cut the cloth at the required time by an oscillating or reciprocating lever worked by a crank-arm or cam above the carriage or by means of a traveling chain, band, or other device. The knife-spindle is fitted with a pinion gearing in a rack, and the movement of the knife sliding across the face of the cloth causes it to rotate rapidly.

The lower frame of the carriage which carries the delivery-rollers is capable of sliding vertically in suitable guides and is counterbalanced by a weight or weights attached to a chain or chains or bands passing over pulleys. The chain or band by which it is suspended, or it may be a rack, engages with a toothed wheel, which is rotated part of a revolution at each traverse, raising the carriage-frame a distance equal to the thickness of the cloth. The amount of lift is adjusted by a lever connected to a roller which lies or rests upon the cloth. This lever is connected to a pivoted lever at its upper end, which is actuated by a cam on a rotating shaft, and as the roller is moved backward or forward by the cloth the first lever is moved up or down, and the pivot of the second lever is moved to or from the cam, and thus the length of lift increased or decreased. The free end of the pivoted lever is by a suitable connecting-rod connected with a pawl, which engages a ratchet and rotates the chain or toothed wheel by which the frame is suspended. The length of lift of the lever determines the distance the wheel is rotated and consequent thereon the distance the delivery-rollers and frame are lifted. In order to maintain the distance between the nip of the delivery-rollers and the receiving-rollers constant, the endless bands pass over a pair of rollers, which are gradually moved inward by an inclined plane or pair of cranked arms as the lower frame is raised, causing the endless bands to take a zigzag path, and thus always contain the same length of cloth inclosed between them.

In order that the improvements may be better understood, I will, with the aid of the accompanying drawings, proceed more fully to describe means employed by me.

In the drawings, Figure 1 is a general view, in side elevation, of apparatus arranged in accordance with my improvements; and Fig. 2 is a plan view of a portion of such apparatus, while Fig. 3 is an end view of the reversing mechanism. Fig. 4 is a side elevation of the traveling carriage, and Fig. 5 a side section of the same, while Figs. 6 and 7 are a front elevation and cross-section, respectively, of such carriage.

For the sake of clearness some parts of the apparatus have been omitted from certain views in cases where such parts are shown in other views.

The same letters indicate corresponding parts wherever they occur.

$a$ is the main frame or carrier, which in the example shown is formed with vertical rails supported from the ceiling by hangers $a'$.

B is the traveling carriage, and $b'$ the wheels or runners which rest upon the frame $a$ and enable the carriage B to be traversed to and fro by the chains $a^2$ $a^3$, passing over pulleys $a^4$ $a^5$ at each end of the apparatus. Reversing is accomplished in the case shown through the bevel-gearing $a^6$ and clutch $a^7$, which latter is operated in manner following. At one side of the frame $a$ is a bar $a^8$, mounted between antifriction-bowls $a^9$ and provided with a fixed stop $a^{10}$ and an adjustable stop $a^{11}$. With one of these stops a projection $b^2$ on the carriage B comes in contact at each extremity of travel, and thereby moves the bar $a^8$. This bar thereupon actuates the bell-crank lever $a^{12}$, which in turn moves the bar $a^{13}$ and so pulls or pushes over the pivoted lever $a^{14}$, which actuates the clutch $a^7$, as shown in Fig. 3. The stop $a^{11}$ may be temporarily fixed at any point in the length of the bar $a^8$, by which means the extent of traverse of the carriage B may be varied, as required, to give longer or shorter folds to the cloth, and such adjustable stop $a^{11}$ may be provided with a pointer, as shown, to correspond with any scale marked on the frame $a$.

$c$ is the cloth, and $d^3$ is a table receiving the same.

$b$ is the carriage-framing, suspended from the wheels $b'$, upon which framing are mounted the rollers $b^3$ $b^4$ $b^5$ $b^6$, which feed forward the cloth $c$ after the same has passed from the supply-roll over the small conducting-roller $b^7$. The rollers $b^4$ $b^6$ are journaled in loose or pivoted arms or brackets $b^8$ $b^9$ to allow for different thicknesses of cloth. Over the rollers $b^5$ $b^6$ are passed the sets of bands $d'$ $e'$, which also pass around the bottom feed-rollers $d$ $e$ and about the guide-rollers $f$ $g$ $g'$. These bands run parallel and adjacent between the rollers $b^5$ $b^6$ and $d$ $e$, so as to grip the cloth, which is delivered through the guide or chute $d^2$ onto table $d^3$. The rollers $d$ $e$ are mounted in bearings $d^6$, which are pivoted at $d^4$ to a block $d^5$, which block is capable of sliding to and fro within a slot $h^3$ in the auxiliary framing $h$. The block belonging to each bearing is actuated by a chain connected thereto and passing over the chain-wheels $h'$ $h^2$, the latter of which receives motion first in one direction and then in the reverse through the gearing $j$ $j'$, vertical shafts $k$ $k'$, and gearing $l$ $l'$ from the horizontal shaft $m$ at the top of the carriage, which shaft $m$ is operated in manner to be hereinafter described. When the blocks $d^5$ are pulled across the framing $h$, they carry with them the bearings $d^6$ and their rollers $d$ $e$. During this movement the extensions $e^2$ of the bearings come in contact with projections $h^4$ on the frame $h$, whereby the bearings and rollers are thrown over upon the pivot $d^4$ and assume the requisite position for trailing the cloth during the next ensuing traverse of the carriage. The endless bands $d'$ $e'$ are kept tight upon their rollers as the rollers $d$ $e$ are moved from side to side by means of the loose arms $f'$, carrying the weighted rollers $f$, which tend to assume a more vertical position when the bands $d'$ $e'$ slacken at any part.

In order to maintain the length of cloth between the receiving-rollers $b^5$ $b^6$ and the delivery-rollers $d$ $e$ constant, the endless bands $d'$ $e'$ pass over a set of rollers $g'$, which as the frame $h$ rises or falls are moved inward or outward by the cranked arms $g^2$, mounted on the framing $b$ and acted on by projections on the framing $h$, Fig. 4, the frame $b$ being slotted, as shown at $g^0$, Fig. 5, to allow for the lateral motion of the rollers $g'$. By this means the bands $d'$ $e'$ take a zigzag path.

$n$ is a saddle mounted loosely upon two cross-shafts $n'$ and capable of sliding to and fro thereon:

$n^2$ is a circular knife mounted to turn with the pinion $n^3$, which gears into the rack $n^4$. Thus the movement of the knife across the face of the cloth will cause such knife to rotate, Figs. 5 and 7. A resistance-plate or "dead-knife" $n^5$ to enable the knife $n^2$ to effectively operate is shown in Figs. 5 and 6.

The saddle $n$ is traversed by a reciprocating lever $o^5$, fulcrumed at $o^4$ and connected by link $o^3$ to a crank $o^2$, which receives motion through the system of gearing $o'$ and "half-wheel" $o^8$ from the shaft $o$ at the top of the carriage and as hereinafter to be described.

The framing $h$, carrying the delivery-rollers $d\ e$, is capable of sliding vertically within the carriage-framing $b$ along with the shafts $k\ k'$, which rise within the bushes $l^2\ l^3$, connected to the gearing $l\ l'$, to which bushes the shafts are at the same time keyed, so as to be capable of turning therewith. A rack upon the said framing $h$ engages at each side of the carriage with a pinion $p$, Figs. 5 and 6, which pinions $p$ are rotated part of a revolution at each extremity of the carriage's traverse, so as to lift the framing $h$ a distance equal to the thickness of the cloth. The pinions $p$ are connected and operated by a shaft $p'$, which carries a ratchet $p^2$, operated by pawl $p^3$ from link $p^4$ at the end of the lever $p^5$. The amount of lift is adjusted by means of a "feeler-roller" $r$, which presses upon the cloth against the carrier-roller $b^7$, Fig. 5. This roller $r$ exerts varying pressure, through spring-spindles $r'$, upon levers $p^6$, connected by a cross-shaft $p^8$, and an arm of one lever $p^6$ is connected by the link $p^9$ to another lever $p^7$, which as a thicker or thinner cloth causes the roller $r$ to exert greater or less pressure upon the system of levers forces the cam $s'$ more or less along the shaft $s$ against the spring $s^0$. The cam $s'$ having an inclined surface, it will be seen that as it is moved laterally a greater or less amount of eccentricity will be presented to the lever $p^5$, which rests upon the cam, and such lever as the cam revolves will consequently be lifted to a degree varying with the position of the latter on the shaft. The lifting of the lever $p^5$ actuates the link $p^4$ and pawl $p^3$, and thus the ratchet $p^2$ is operated to a corresponding degree.

Apparatus to counterbalance the framing $h$ is indicated in dotted lines at $h^4$ in Fig. 5.

The shaft $s$ has motion given to it at the proper time through the gearing $s^2$ and half-wheel $s^3$ from the shaft $o$.

$t\ u$ are bands or chains from the shafts $o$ and $w$, respectively, to drive the roller $b^3$, and $v$ is a band or chain connecting $b^3$ with the roller $b^5$ to drive the latter from the shaft of the roller $b^3$, as shown in Figs. 4, 5, and 7.

The action of the apparatus is as follows: Motion is given to the carriage B by setting the chains $a^2\ a^3$ in action, a stop $y$ on each chain coming in contact with one extremity of the carriage and drawing the same along. Thus the chain-wheels on the shafts $o$ and $m$ at the top of the carriage are not operated during traverse. On the other hand, the lower chain-wheels $w^2\ w^3$ on the shaft $w$ are rapidly revolved by the motion of the carriage and the reverse motion of the lower lengths of the chains $a^2\ a^3$, which latter act upon the wheels $w^2\ w^3$ to drive the same, and such wheels $w^2\ w^3$ turn in opposite directions one to the other, for the reason that the chain $a^2$ gears over the wheel $w^2$ and the chain $a^3$ gears under the wheel $w^3$, Figs. 4, 5, and 7. By means of ratchets $w'$, attached to the shaft $w$ and a pawl $w^0$ with each wheel $w^2\ w^3$, neither wheel operates the shaft $w$, except in the direction required to drive the feed-roller $b^3$ through the band $u$. It will thus be seen that in whatever direction the carriage B is traveling one of the wheels $w^2\ w^3$ will operate the shaft $w$; but whichever wheel is in operation the direction of such shaft will remain constant. When the carriage B arrives at an extremity of travel and the direction of the chains $a^2\ a^3$ is reversed, the stop $y$ is carried across the carriage before the latter can again be moved, and thus the chain-wheels $m^2\ m^3\ m^4$ are temporarily set in motion. These wheels are all loose upon the shaft, and the wheels $m^2$ and $m^3$ are each provided with a pin or projection $m^0$, which takes into a slot in a disk $m^5\ m^6$, adjacent to each wheel and keyed to the shaft $m$. By this means the pins move within the slots for the first half-movement of the wheels $m^2\ m^3$, and the shaft is not revolved. By a similar device the shaft $w$ also remains stationary until the latter part of this temporary operation, $w^4$ being the pins and $w^5$ the slot in each disk $w^6$, Figs. 5 and 7. Meanwhile the wheel $m^4$ has immediately operated the wheel $o^6$ through chain $m^7$, and for the first half of the movement operates through the half-wheels $s^3\ o^8$ the corresponding gearing $s^2\ o'$, which, as has already been described, operate the raising of the frame $h$ and the traverse of the cutting-knife $n^2$ to cut the cloth. At the second half of the movement the half-wheels $s^3\ o^8$ do not operate, presenting blanks in lieu of teeth; but the half-wheel $o^7$ now comes into operation, and through the bevel-gearing $o^9$ enables the wheel $t'$ to drive the band $t$, which gives to the roller $b^3$ a speed equal to that imparted by the band $u$ when the carriage is in motion. Thus the wheel $t'$ is turned half a revolution only, whereas the shaft $o$ completely revolves.

In order that the shaft $o$ may turn in one direction only notwithstanding the reciprocatory movement of the chain-wheel $o^6$, the gearing $o^{10}$ and ratchet-and-pawl mechanism $o^{11}$ $o^{12}$ are employed, whereby one of the pawls $o^{11}$ will operate upon its ratchet $o^{12}$, keyed to the shaft $o$, whatever may be the direction of the chain-wheel $o^6$, for the time being, while the other pawl will slip over its ratchet.

It will be readily understood that to effect the foregoing operations from the movement of the chain-wheel $o^6$ the half-wheels $s^3\ o^7\ o^8$ and the ratchets $o^{12}$ are keyed to the shaft $o$, while the remaining mechanism on such shaft is free to turn independently. It will now be seen that when the carriage B stops at each extremity of its travel and the chains $a^2\ a^3$ operate without drawing the carriage the cutting of the cloth and raising of the frame $h$ are first effected, while during the second part of the operation the bands $t\ v$ are actuated to drive the roller $b^5$, so as to deliver the end of the length of cloth that is cut, and at the same time the shaft $m$ is revolved along with the gear-wheels $l\ l'$, keyed thereon, and consequently, as described, the rollers $d\ e$ are traversed, whereby the end of cloth still within the carriage is laid upon the table.

The band $t$ is employed for auxiliary driving of the rollers $b^3\ b^5$ in lieu of the band $u$, for the reason that while the carriage B is stationary the lower chain-wheels $w^2\ w^3$, and therefore the band $u$, move at a much slower speed than when the carriage B is traveling, whereas it is desirable to deliver the cloth at the same speed throughout. Any excess of speed imparted to the band $u$ during this auxiliary feeding motion is, however, lost in the slipping of the pawls $w^0$ over the ratchets $w$. When the carriage B is traveling, the pawl $t^2$ in its turn slips over the revolving ratchet $t^3$, which is keyed to the shaft of the roller $b^3$, and thus the band $t$ is not moved. The chain-stops $y$ having been drawn across the top of the carriage come in contact with the opposite extremity thereof, and the movement of the chains $a^2\ a^3$ effects the next traverse of the carriage, the entire operation as herein described being repeated. The apparatus may be stopped by throwing strap $z$ onto loose pulley $z'$ in any known manner.

Variations in the design and material of the different parts may be made without departing from the peculiar character of the invention.

Having now particularly described and ascertained the nature of my said invention and in what manner the same is to be performed, I declare that what I claim is—

1. In a reciprocating carriage B, the combination of the cloth-delivery rollers $d$, $e$, and their bearings $d^6$; the blocks $d^5$; the frame $h$, the chains or bands attached to the block; the wheels $h'$, $h^2$, operating the chains; the gearing $j$, $j'$; shafts $k$, $k'$; bushes $l^2$, $l^3$, and gearing $l$, $l'$ actuating the said wheels $h'$, $h^2$; the shaft $m$, slotted disks $m^5$, $m^6$, and chain-wheels $m^2$, $m^3$, operating the gearing $l$, $l'$; and the chains $a^2$, $a^3$, operating the chain-wheels $m^2\ m^3$, substantially as, and for the purpose set forth.

2. In a reciprocating carriage B; and in combination, the bands $d'$, $e'$; the rollers $b^5$, $b^6$, $d$, $e$, carrying the same; the rollers $f$, $g$, $g'$, guiding said bands, the tension-levers $f''$; the cranked arms $g^2$, and the frames $b$, $h$, for the purpose and substantially as set forth.

3. In a reciprocating carriage B, and in combination, the saddle $n$, rods $n'$, carrying same; knife $n^2$, and pinion $n^3$, on the saddle; rack $n^4$; "dead-knife" $n^5$; lever $o^5$, operating said saddle $n$, link $o^3$, crank $o^2$, gearing $o'$, half-wheel $o^8$, and shaft $o$, operating said lever $o^5$; gearing $o^{10}$, pawls and ratchets $o^{11}$, $o^{12}$; wheel $o^6$, chain $m^7$, wheel $m^4$, and chains $a^2$, $a^3$, operating shaft $o$, for the purpose and substantially as set forth.

4. In a reciprocating carriage B, and in combination, the chains $a^2$, $a^3$, wheel $m^4$, chain $m^7$, wheel $o^6$, gearing $o^{10}$, and ratchets and pawls $o^{12}$, $o^{11}$, all operating shaft $o$; said shaft $o$, half-wheel $o^7$, and gearing $o^9$; wheel $t'$ operated thereby, band $t$, and pawl $t^2$, operated by wheel $t'$; and ratchet $t^3$, acted on by pawl $t^2$, for the purpose and substantially as set forth.

5. In a reciprocating carriage B, and in combination, the chains $a^2$, $a^3$; chain-wheels $w^2$, $w^3$, driven thereby, disks $w^6$, ratchets $w'$, pawls $w^0$, and shaft $w$, operated by said chain-wheels $w^2$, $w^3$; band $u$, roller $b^3$, band $v$, and roller $b^5$, driven by said shaft $w$, for the purpose and substantially as set forth.

6. In a reciprocating carriage B, and in combination, the frame $h$, pinions $p$, raising same; counterbalance $h^4$; shaft $p'$ carrying pinions $p$; ratchet $p^2$, pawl $p^3$, link $p^4$, lever $p^5$, and cam $s'$, operating shaft $p'$; shaft $s$, operating said cam; gearing $s^2$, $s^3$, and shaft $o$, actuating-shaft $s$; the shaft $o$, being driven as aforesaid, for the purpose, and substantially as set forth.

7. In a reciprocating carriage B, and in combination with the cam $s'$, aforesaid, the levers $p^7$, $p^8$, and $p^6$; and the feeler-roller $r$ operating such levers, for the purpose and substantially as set forth.

8. In combination, the carriage B; reciprocating chains $a^2$, $a^3$, and stops $y$, on said chains, operating said carriage; wheels $a^4$, $a^5$, driving said chains, and wheels $m^2$, $m^3$, operated by said chains, substantially as and for the purpose set forth.

JAMES BERNARD BARTON.

Witnesses:
GEORGE FREDERICK GADD,
ARTHUR GADD.